United States Patent
Porteous et al.

(10) Patent No.: US 6,743,362 B1
(45) Date of Patent: Jun. 1, 2004

(54) SEWAGE TREATMENT PROCESS

(75) Inventors: James Porteous, Austin, TX (US); Hiren K. Trivedi, Cedar Park, TX (US); Dennis C. Livingston, Austin, TX (US)

(73) Assignee: Enviroquip Inc., Austin, TX (US)

( * ) Notice: Subject to any disclaimer, the term of this patent is extended or adjusted under 35 U.S.C. 154(b) by 0 days.

(21) Appl. No.: 10/174,223

(22) Filed: Jun. 17, 2002

(51) Int. Cl.$^7$ .................................................. C02F 3/30
(52) U.S. Cl. ........................ 210/605; 210/614; 210/630; 210/260; 210/903
(58) Field of Search .............................. 210/605, 614, 210/621, 622, 630, 205, 220, 258, 259, 260, 903, 908

(56) References Cited

U.S. PATENT DOCUMENTS

| | | | |
|---|---|---|---|
| 4,210,528 A | * | 7/1980 | Coviello et al. ............ 210/605 |
| 5,013,441 A | * | 5/1991 | Goronszy ................... 210/605 |
| 5,192,456 A | | 3/1993 | Ishida et al. |
| 5,906,746 A | | 5/1999 | Helmo et al. |
| 6,039,873 A | * | 3/2000 | Stahler ........................ 210/605 |
| 6,086,765 A | * | 7/2000 | Edwards ..................... 210/605 |
| 6,290,849 B1 | * | 9/2001 | Rykaer et al. .............. 210/605 |
| 6,562,237 B1 | * | 5/2003 | Olaopa ........................ 210/605 |
| 2002/0148779 A1 | * | 10/2002 | Shieh et al. ................ 210/605 |

FOREIGN PATENT DOCUMENTS

| | | | |
|---|---|---|---|
| JP | 3-262600 | * | 11/1991 |
| JP | 11-128983 | * | 5/1999 |

* cited by examiner

*Primary Examiner*—Fred G. Prince
(74) *Attorney, Agent, or Firm*—Thomas M. Freiburger

(57) ABSTRACT

A sewage treatment plant, on the liquid side, is operated so as to effect nitrification and denitrification within a single tank and simultaneously to remove water, without the need for separate clarification. An aerobic/anoxic zone is maintained in a single tank, wherein the SymBio process of U.S. Pat. No. 5,906,746 is maintained. This is combined with the advantages of an MBR process, by placing a series of membrane separators within the tank and continuously withdrawing nearly pure water. Supplemental process air provided in the MBR tank is controlled by the SymBio process to maintain simultaneous nitrification and denitrification in a single tank and thus reducing the additional process air requirements.

10 Claims, 1 Drawing Sheet

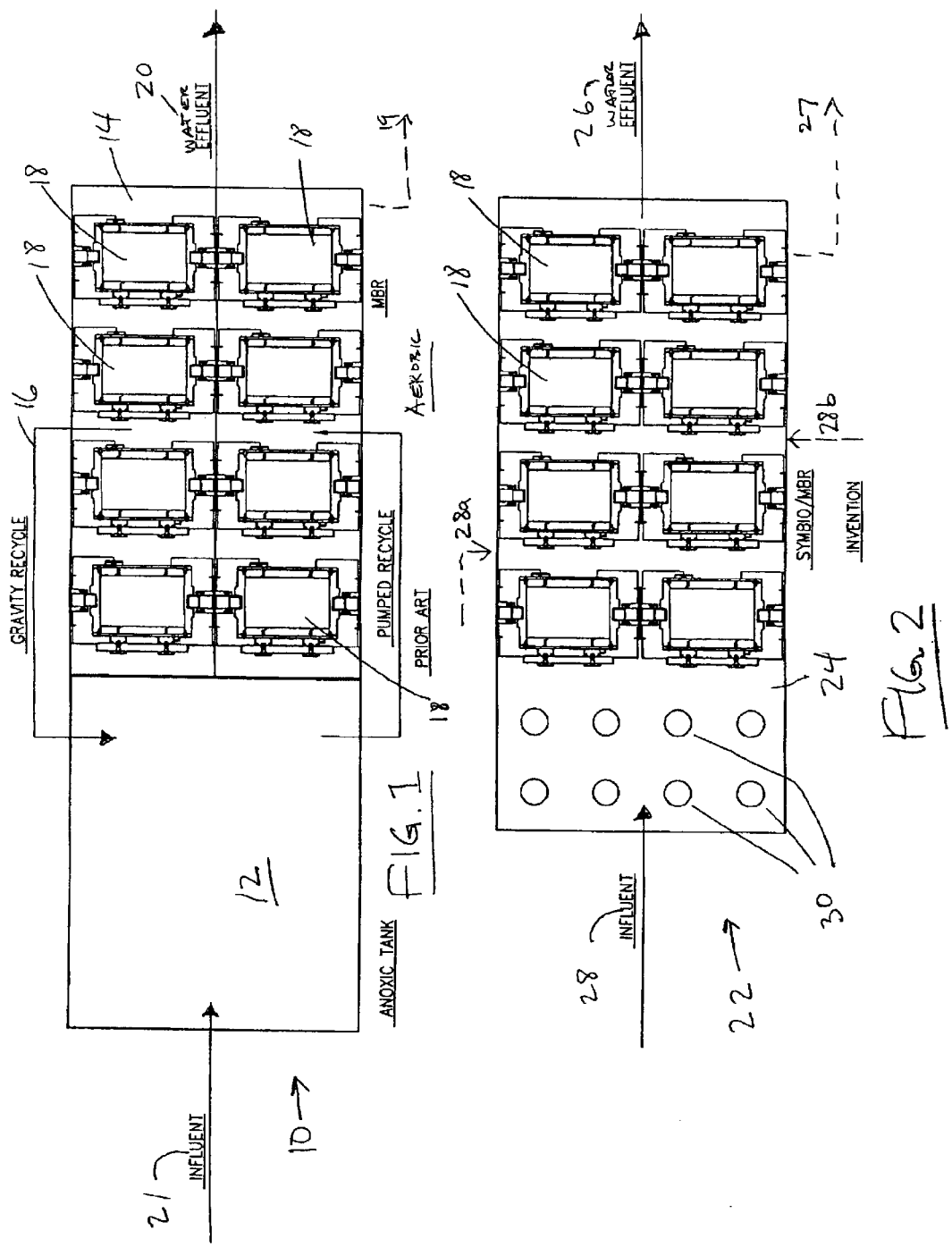

SEWAGE TREATMENT PROCESS

BACKGROUND OF THE INVENTION

This invention concerns sewage treatment, and relates particularly to an enhancement of a known process, eliminating a step normally included on the liquid side of a wastewater treatment plant, with attendant savings in space and cost.

On the liquid side of a conventional activated sludge sewage treatment plant, nitrification and denitrification often occur in several tanks that successively handle the influent wastewater, with recycling of sludge from an aerobic tank to an anoxic tank. A portion of the wastewater exiting the aerobic tank is not recycled to the anoxic stage and normally is subjected to secondary clarification, in one or more clarifier tanks.

In one prior art process, the secondary clarification was eliminated by use of membrane separators. An activated sludge process incorporating membranes for the purpose of filtration to eliminate the need for subsequent clarification is referred to as a membrane bioreactor (MBR). This known technology is described, for example, in U.S. Pat. No. 5,192,456. An MBR plant designed for removing nitrogen biologically usually includes a separate anoxic stage followed by an aerobic stage, which is the MBR. This process requires that mixed liquor be recycled from the aerobic stage back to the anoxic stage to maintain bacterial populations, and to provide nitrates for the anoxic stage. In this way, in the anoxic stage, nitrogen gas is released as microbes obtain oxygen from nitrates coming from the aerobic stage via the recycle. Nitrification occurs in the aerobic (MBR) stage.

Such a prior MBR process is schematically indicated in FIG. 1 of the drawings.

Another, different activated sludge process, known as the SymBio process, uses measurement and adjustment of process parameters to maintain low oxygen concentration below 1.0 mg/l allowing simultaneous nitrification and denitrification in a single treatment tank and thus eliminating need for a separate anoxic stage, as well as the need for mixed liquor recycle. Further, maintaining low oxygen concentration below 1.0 mg/l reduces the energy requirements for the desired treatment. However, the SymBio process has typically been used in conjunction with a separate clarification step to isolate solids from the treated water, and the separated solids are recycled back to the treatment tank to maintain bacterial population in the tank. The SymBio process is described in U.S. Pat. No. 5,906,746, which is incorporated herein by reference.

SUMMARY OF THE INVENTION

In the treatment process and system of this invention, the MBR process described above is combined with the SymBio technology of U.S. Pat. No. 5,906,746, to eliminate the need for both recycle and clarification and to minimize tank requirements. The process and the system of the invention can significantly reduce the footprint, energy consumption, sludge production, chemical consumption and capital cost of a wastewater treatment plant.

Pursuant to the present invention, the advantages of both the SymBio process and the MBR reactor process are realized, with nitrification and denitrification achieved in a single tank and with membrane separators in the same tank so as to eliminate the need for separate clarification. The process of the invention goes beyond both the prior processes mentioned by enabling the nitrification/denitrification process, and the removal of water, to be accomplished in a single tank if desired. Still further, the new process makes an additional improvement over an MBR reactor system in that additional process air, often needed in MBR systems to satisfy the oxygen demand of the biomass to oxidize the organic contaminants, is significantly reduced as it is regulated by the SymBio process. In a typical MBR reactor, air is provided for two purposes: (a) to keep the membranes clean by agitation with the air; and (b) to satisfy oxygen demand of the microorganisms and to remove the organic contaminants. The MBR system needs a fixed amount of air to keep the membranes clean. This is dictated by the quantity or square footage of the membrane separators. Normally, however, this quantity of air is not sufficient to meet the needs of the microorganisms to remove the contaminants, and additional process air must be introduced. The supplemental process air can be supplied within the MBR tank, or it is often supplied in a separate aerobic tank. By combining the SymBio process with the MBR technology, the invention reduces and minimizes process oxygen requirements and hence reduces the supplemental air requirements. It is noted that with the invention the membranes need not necessarily be cleaned by air; other means such as liquid recirculation can also be used.

As noted above, the need for recycle of sludge is eliminated by the invention, because the SymBio process combines nitrification and denitrification within a single tank. Separate clarification is also eliminated, and along with it the recycle of sludge from a clarifier back to the anoxic tank, or the anoxic/aerobic tank, is also eliminated. The invention can in this way make significant reduction of the footprint, energy consumption, capital cost and chemical consumption of a wastewater treatment plant. These and other objects, advantages and features of the invention will be apparent from the following description of a preferred embodiment, considered with the drawings.

DESCRIPTION OF THE DRAWINGS

FIG. 1 is a schematic view showing a prior art MBR reactor system.

FIG. 2 is a schematic plan view showing the process of the invention.

DESCRIPTION OF PREFERRED EMBODIMENTS

In the drawings, FIG. 1 shows in schematic plan view a prior art system 10, an example of the use of an MBR system in the liquid side of a wastewater treatment plant. In the system 10, influent wastewater enters an anoxic tank 12, from which it is pumped, preferably on a continuous basis, into an aerobic tank 14. Recycle of nitrified sludge is indicated at 16. As is well known, this maintains bacteria population in the anoxic tank and also provides nitrates for microbes to break down in the anoxic tank, releasing nitrogen.

The aerobic tank 14 is of the type known as an MBR system. A plurality of membrane separator units 18 are provided beneath the liquid surface in the MBR tank 14, and aeration which occurs in this aerobic zone is effective to clean the membrane separators 18 due to the agitation caused by the air. As explained above, such an MBR system has the advantage of eliminating the need for secondary clarification, as by several clarifiers downstream of the aerobic tank. Nearly pure water is removed by the micropore membrane separating units 18, and this volume of water removed at 20, added to the sludge withdrawn periodically from the MBR at 19 (normally to be delivered to digesters), is in balance with volume of influent entering the system at 21.

FIG. 2 shows a system 22 according to the invention. In FIG. 2, the aerobic and anaerobic zones (such as in the tanks 12 and 14 in FIG. 1) are combined into a single tank 24. As explained above, in this single tank the process of U.S. Pat. No. 5,906,746 is maintained, whereby oxygen concentration is maintained in a range of less than about 1.0 ppm, with that range fluctuating under the controls of the process. Both nitrification and denitrification take place in the single tank 24 pursuant to the SymBio process, under which the status of the bacteria is detected, such that when the first of the bacteria to begin to turn anaerobic is detected in the anoxic stage of the process, oxygen is then added by increased aeration.

It is a characteristic of the SymBio process, and of the present process, that nitrification and denitrification occur to some extent simultaneously within the tank. Each process is greater or lesser with changes in dissolved oxygen content, but both also occur simultaneously. Dissolved oxygen is not taken to zero when aeration is reduced; some bacteria in the tank, however small in number, will still have oxygen available and thus will be aerobic, even though the majority may be in the anoxic condition. Likewise, when oxygen content is highest, some portion of the bacteria population will be anoxic. Thus, the aerobic/anoxic conditions change with time but also overlap in time, occurring simultaneously.

As shown in FIG. 2, the invention combines the advantages of an MBR process with the SymBio process, by including a plurality of membrane separators 18 within the single anoxic/aerobic tank 24.

Influent wastewater is shown entering the tank 24 at 28. For optimum mixing in a tank which may be elongated, the influent may be introduced at multiple points; additional influent points are shown at 28a and 28b.

Thus, in the process of FIG. 2, while the SymBio process proceeds, preferably on a continuous flow basis (but optionally at intermittent flow), effluent water at 26 is withdrawn via the membrane separators 18 in the tank 24. The excessive biological sludge generated during the treatment is periodically withdrawn at 27 from the MBR and usually transferred to digesters. No recycle is required at any point in the system of FIG. 2.

An added benefit of the invention, as explained above, is that significantly less supplemental aeration to satisfy the process air requirements is needed, compared to the prior art systems such as FIG. 1. This is because under the SymBio process, aeration requirements are minimized and aeration is essentially controlled and not wasted. Aeration to agitate and clean the membrane separators 18 will normally be continuous, but at a level not sufficient to support process air requirements throughout the SymBio cycle. Some supplemental air will be required, and supplemental aeration is indicated at 30.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

We claim:

1. In a sewage treatment plant and process having a liquid side in which nitrogen removal is effected, a method of operating the liquid side of the treatment process so as to effect nitrification and denitrification within a single tank and simultaneously to remove water, comprising:

maintaining an aerobic/anoxic zone in a tank receiving plant influent wastewater, wherein nitrification and denitrification occur simultaneously and continuously, maintaining dissolved oxygen concentration in the aerobic/anoxic zone in a fluctuating range, allowing dissolved oxygen concentration to approach the lower end of said range and monitoring the status of bacteria in the aerobic/anoxic zone and detecting when some of the bacteria in the zone turn anaerobic, after the anaerobic condition has been detected, increasing dissolved oxygen in the aerobic/anoxic zone by increasing aeration to promote nitrification with the formation of nitrates, then reducing aeration to the aerobic/anoxic zone to an extent to allow the bacteria to consume dissolved oxygen and then to consume nitrates in a denitrification cycle, releasing nitrogen gas, repeating the steps of monitoring, increasing dissolved oxygen and reducing aeration, and simultaneously removing filtrate water from the wastewater in the aerobic/anoxic zone while conducting the above steps, using at least one membrane separator in the aerobic/anoxic zone, whereby need for separate clarification on the liquid side of the plant is eliminated.

2. The method of claim 1, wherein the fluctuating range of dissolved oxygen concentration is about 0.1 ppm to about 1.0 ppm.

3. The method of claim 1, with continuous flow maintained into and out of the aerobic/anoxic zone tank.

4. The method of claim 1, with intermittent flow into and out of the aerobic/anoxic zone tank.

5. The method of claim 1, further including removing sludge as an effluent from the aerobic/anoxic zone tank, to go to a solids side of the treatment plant.

6. The method of claim 1, wherein the aerobic/anoxic zone tank receives influent wastewater at multiple points so as to maintain substantially complete mix conditions.

7. The method of claim 1, including the step of agitating the wastewater at the membrane separator while aerating, using turbulence caused by aeration in the aerobic/anoxic zone, thereby cleaning the membrane separator of clogging.

8. In a sewage treatment plant having a liquid side in which nitrogen removal is effected, a nitrification/denitrification and water removal subsystem within a single tank, avoiding the need for downstream clarifiers, comprising:

a single tank receiving plant influent wastewater and defining an aerobic/anoxic zone, aerators in the single tank, at least one membrane separator within the single tank positioned to remove filtrate water from the wastewater in the aerobic/anoxic zone, and control means for:
> maintaining dissolved oxygen concentration in the aerobic/anoxic zone in a fluctuating range,
>
> allowing dissolved oxygen concentration to approach the lower end of said range and monitoring the status of bacteria in the aerobic/anoxic zone and detecting when some of the bacteria in the zone turn anaerobic,
>
> after the anaerobic condition has been detected, increasing dissolved oxygen in the aerobic/anoxic zone by increasing aeration to promote nitrification with the formation of nitrates,
>
> then reducing aeration to the aerobic/anoxic zone to an extent to allow the bacteria to consume dissolved oxygen and then to consume nitrates in a denitrification cycle, releasing nitrogen gas, and
>
> repeating the steps of monitoring, increasing dissolved oxygen and reducing aeration, while simultaneously extracting water with the membrane separator, whereby need for separate clarification on the liquid side of the plant is eliminated.

9. The invention of claim 8, wherein the fluctuating range of dissolved oxygen concentration is about 0.1 ppm to about 1.0 ppm.

10. The invention of claim 8, wherein at least some of the aerators being located adjacent to the membrane separator so as to agitate the wastewater at the membrane separator while aerating, using turbulence caused by the aeration in the aerobic/anoxic zone to thereby clean the membrane separator of clogging.

\* \* \* \* \*